Feb. 20, 1973   J. R. FALCONE ET AL   3,717,126
FEEDER
Filed Sept. 14, 1970   4 Sheets-Sheet 1
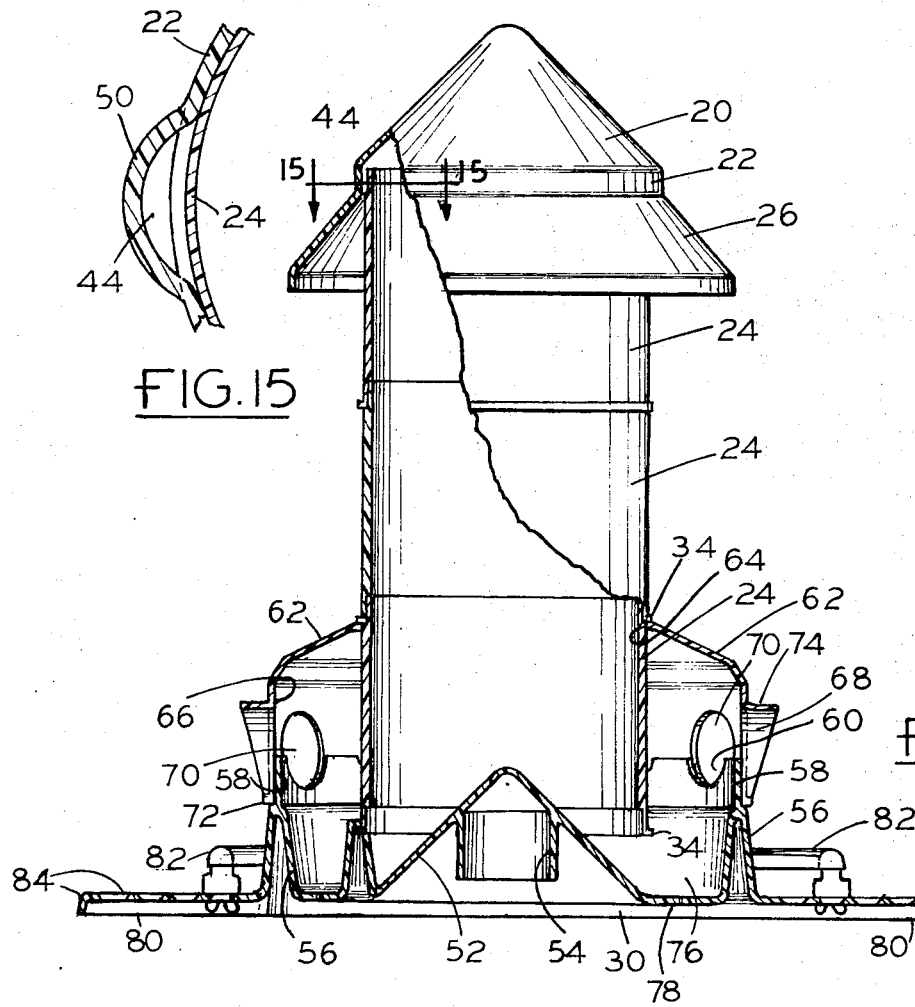
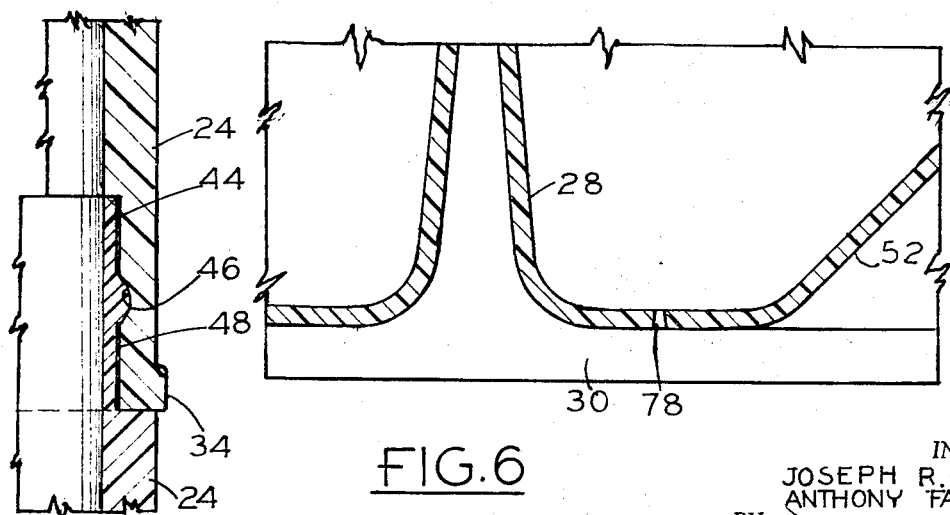
INVENTORS.
JOSEPH R. FALCONE
ANTHONY FALCONE, JR
BY
ATTORNEY

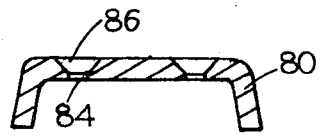
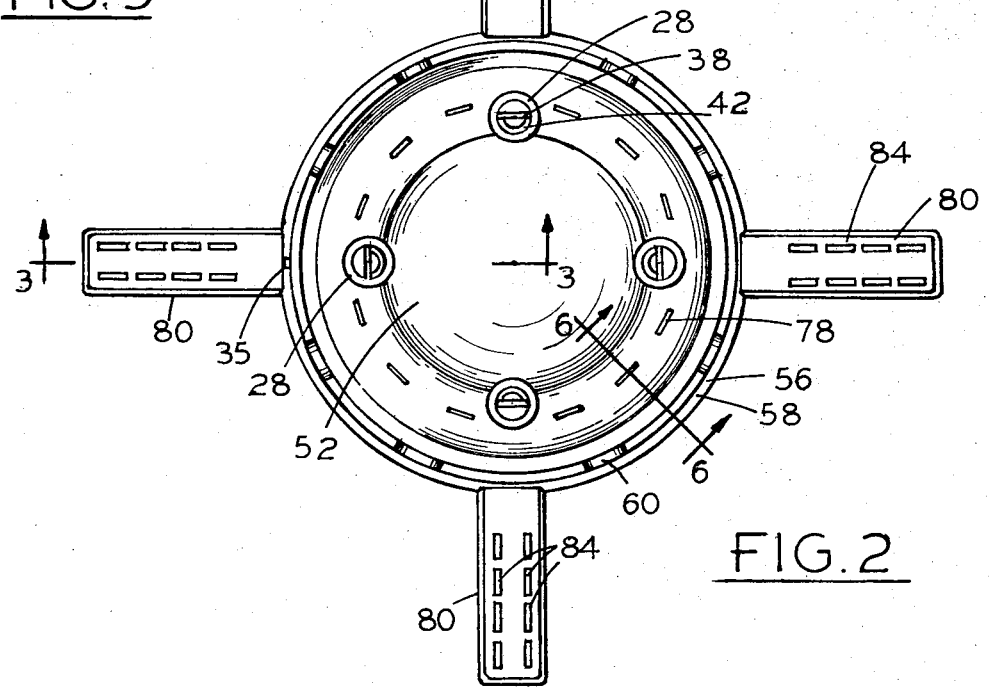
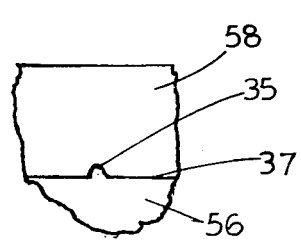
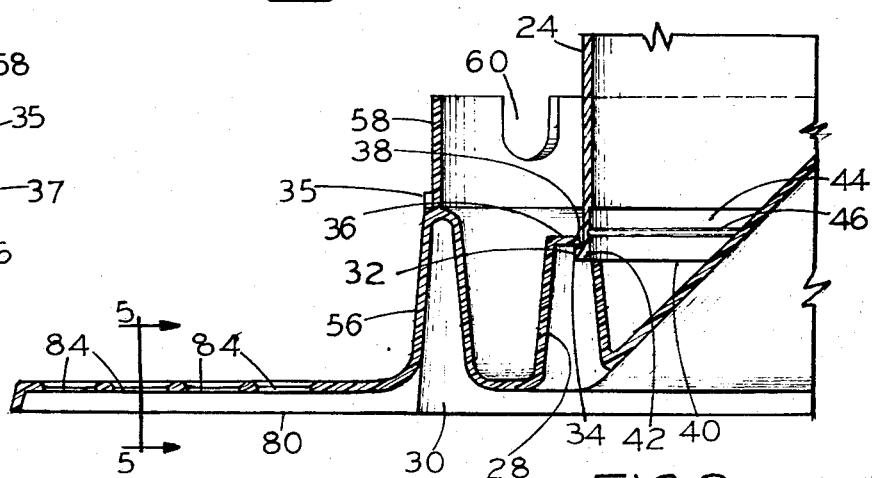

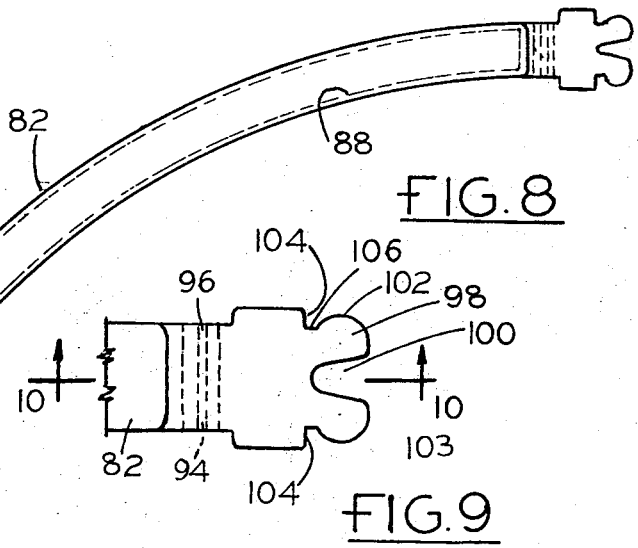
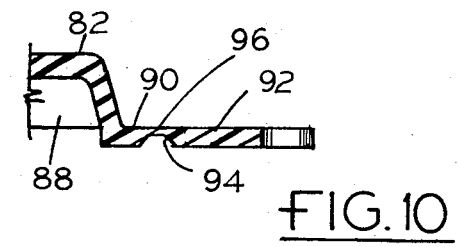
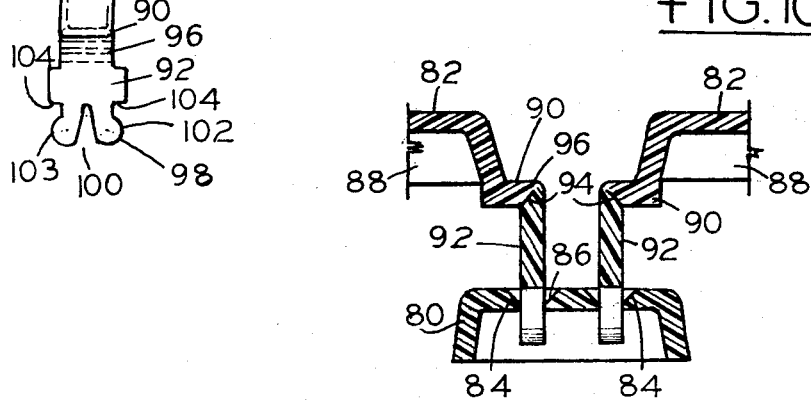

Feb. 20, 1973   J. R. FALCONE ET AL   3,717,126
FEEDER

Filed Sept. 14, 1970   4 Sheets-Sheet 4

INVENTORS
JOSEPH R. FALCONE
ANTHONY FALCONE, JR.
BY
ATTORNEY

United States Patent Office
3,717,126
Patented Feb. 20, 1973

1

3,717,126
FEEDER
Joseph R. Falcone, 217 Cooper Lane, Dewitt, N.Y. 13214, and Anthony Falcone, Jr., 207 Oak Ridge Drive, Camillus, N.Y. 13031
Filed Sept. 14, 1970, Ser. No. 71,981
Int. Cl. A01k 39/00
U.S. Cl. 119—52 R                                                                           4 Claims

ABSTRACT OF THE DISCLOSURE

Bird feeder with silo type magazine in sections, and annular feeder trough having side wall apertures of different size for different size birds, and with perches arranged at different radii to correspond to the aperture size, to encourage birds of different sizes to segregate to different sectors to minimize conflicts between large and small birds.

This invention relates to outdoor feeders for birds.

In outdoor feeders for birds it is usual to supply the feeder with cracked grain, seeds and the like from time to time, and often on a daily routine. Because of adverse weather conditions, it is often impractical to supply the feeder daily, which deprives the birds of food at a time when most needed. It is also often the case that birds of a large size will tend to drive off smaller birds from such feeders. The present invention is directed to a feeder that can have a magazine that is readily variable as to capacity, and from which flow of feed is blocked by a trough, access to which is limited to protected side apertures. Additionally, provision is made for supplying feed apertures on one side of the feeder for a different size than those on the other side, and for placing the perches for the birds at varying radiuses in respect to the feed apertures, so as to encourage birds of a small size to use one side of the feeder, while encouraging larger birds to use the other side, to thereby avoid conflicts. The invention further has to do with a knock-down feeder, readily assembled, with all parts capable of being molded of a suitable plastic, and without tools.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings where like reference characters indicate like parts:

FIG. 1 is a side elevation of the feeder with portions cut away.

FIG. 2 is a plan view of the feeder dispenser base.

FIG. 3 is an enlarged sectional view taken on the line 3—3 of FIG. 2.

FIG. 4 is a fragmentary detail of a key shown in FIG. 3.

FIG. 5 is an enlarged sectional view taken on the line 5—5 of FIG. 3.

FIG. 6 is an enlarged sectional view taken on the line 6—6 of FIG. 2.

2

FIG. 7 is an enlarged fragmentary sectional view of the joint between the silo feed sections and cap.

FIG. 8 is an enlarged plan view of a perch.

FIG. 9 is a further enlarged view of the perch end.

FIG. 10 is a sectional view taken on the line 10—10 of FIG. 9.

FIG. 11 is a sectional view of a perch end hinged at a right angle and locked into its slot in a perch arm of the feeder dispenser base.

Figure 12:
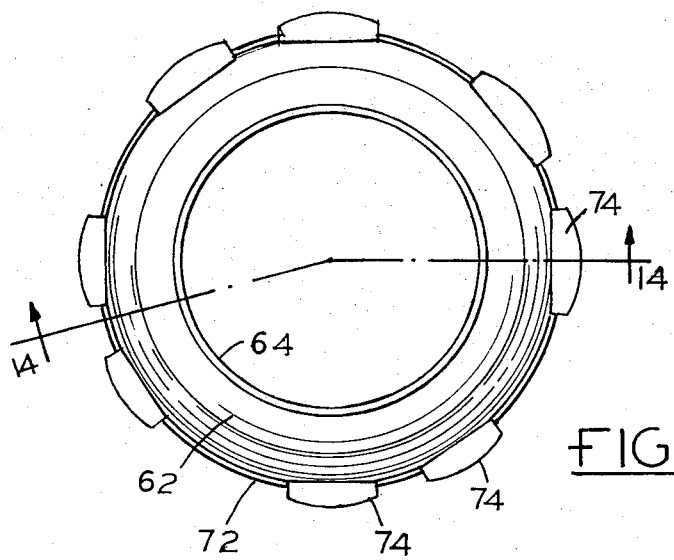

FIG. 12 is a plan view of the dispenser shroud.

Figure 13:
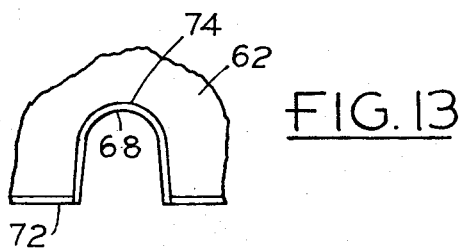

FIG. 13 is a fragmentary side elevation of a side opening in the shroud.

Figure 14:
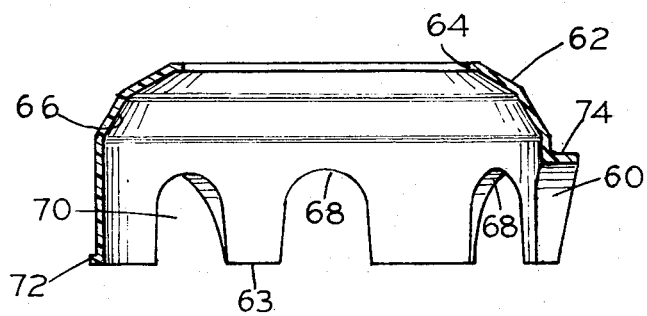

FIG. 14 is a sectional view of the shroud taken on the broken section line 14—14 of FIG. 12.

FIG. 15 is a fragmentary sectional view taken on the line 15—15 of FIG. 1 showing a vent in the silo cap.

In FIGS. 1 and 2 there is shown the feeder and its base which comprises a plurality of elements which are readily moldable of plastic. The feeder comprises a conical cap 20 having a short skirt 22 adapted to telescope over the upper end of a silo-like magazine section 24, the cap having an inclined apron 26 projecting outwardly and downwardly from the skirt 22. Each of the sections 24 are alike and as many sections such as two or more may be employed, depending on the height of the silo magazine desired, so that the feeder may hold a substantial supply of bird seed to avoid frequent or day to day refilling.

The lower silo section is mounted upon a plurality of hollow posts 28 integral with and upstanding from the base 30. The upper ends of the posts are cut away on the inside face as at 32 to receive an external flange or rib 34 disposed at the lower end of each silo section 24. The upper end 36 of each post is formed with an inclined hook as at 38 to permit the flange 34 of the lowermost silo section to be snapped into position so that the lower rim surface 40 of the section may rest upon the surface 42 of each post 28 and be securely held by the overlying projection 38. The base will be made of slightly resilient plastic as will the other parts to permit the lowermost section to snap into place by slight spreading of the posts 28 or deformation of the silo section, or a combination of both.

The lower end of each silo section is provided with an internal cylindrical relief portion 44 having an annular groove 46 disposed midway along the relief area. The upper end of each section is provided with an external relief 48 substantially complemented to the relief 44, the relief 48 having an annular rib 50 adapted to be snapped into the annular groove 46, upon telescoping the parts and utilizing the slight resilience of the plastic of which the parts are composed. The internal surface of the skirt 22 of the cap is provided with a relief and groove similar to 44 and 46 of the lower end of each silo section, so that the lid or cap is resiliently snapped into place at the upper end of the uppermost section of the magazine.

The skirt of the cap 22 is provided with a plurality of vents such as 44, one of which is shown in FIG. 15. The skirt 22 is provided with a suitable bulge 50 which provides a protected vent at the upper end of the magazine so that the air within the magazine may change with the weather conditions to avoid condensate in the magazine. In practice 4 such vents uniformly spaced about the cap are provided.

The base, in addition to the posts 28 which support the lower magazine section 24, is provided with a central conical distributor 52 projecting upwardly into the magazine and the underside thereof is provided with an integral socket 54, adapted to receive a supporting post. The base is provided with an annular upwardly extending loop sectioned outer rim 56 having an upstanding sleeve 58 in which are formed a plurality of substantially semicircular notches 60.

Suitably disposed over the sleeve 58 is an annular dispenser shroud 62 having an upper central aperture 64 adapted to closely fit about the upper end of the lowermost silo section 24, immediately below the relief 48 thereof so that the flange 34 of the section above may bear upon the shroud 62 adjacent to opening 64 to hold the shroud in position. The shroud is provided with a cylindrical depending section 66 which makes a nice sliding fit over the skirt 58. The shroud is provided with a plurality of inverted U-shaped openings 68, which are angularly disposed so as to cooperate with the notches 60 to form circular bird feeder openings, the openings being indicated for example at 70. The lower edge of the shroud is provided with a flange 72 which has a notch (not shown) adapted to key with the projection 35 outside the sleeve 58 of the base to assure alignment and keep from revolving around of the U-shaped openings 68 with the circular notches 60 in the sleeve 58. It will be observed that at the lower end of the sleeve 58 there is a shoulder 37 against which the under edge surface 63 of the shroud 62 bears when properly assembled.

Each of the U-shaped opening 68 in the shroud 62 is provided with a canopy 74 to protect the openings from the elements and to assist in the maintenance of the feed within in a dry condition. The annular trough 76 disposed between the conical distributor portion 52 and the annular rim 56 may be provided with one or more drain slits 78, large enough to permit the flow of water but small enough to hold the bird seed.

The base is provided with radial arms 80, four being shown, for the purpose of supporting arcuate perches as indicated at 82. Each of the arms is provided with a plurality of slots 84 to receive the ends of a perch, the slots being disposed at different radial distances from the center so that perches of different radius may be employed in order to encourage birds of one size or another depending upon the distance of the perch from the feeder apertures 70. As shown in FIGS. 2, 3, 5 and 11, such slots 84 are rectangular in shape and have inclined reliefs 86 to facilitate projection of a perch tab into the slots. It will be observed that each arm 80 is provided with 2 rows of slots to receive the ends of 2 adjacent perches of such radius as desired.

Referring to FIGS. 8 to 11 there is shown an arcuate perch 82 having a radius corresponding to the radius of two slots of the 4 sets of slots in each of the arms 80. Each perch section may be an inverted channel section as indicated at 88 and each end of each perch section is provided with an end tab 90, the outer portion 92 of which may be hinged to a right angle position as indicated in FIG. 11 by reason of the transverse wide V notch 94 provided between the portions 90 and 92, leaving a connecting portion 96 of such thinness as to permit ready flexing as is indicated in FIG. 11.

Each end tab is provided with a split tongue 98 having a central notch 100. The side round edges 102 and 103 of the tongue are adapted to be projected through any one of the feeder arm slots 84 by springing the tongue portions together in projecting the tongue portions through the slot 84. The shoulder 104 is brought to bear upon the upper surfaces of the perch arm 80 with the slender portion of the tongue nicely fitting against the ends of one of the slots 84 of the feeder support arms 80.

It will be seen that by providing a set of arcuate perches for each section having variations in arcuate length and radius, the bird feeder may be fitted out with a perch of 90 degree length relatively close to a feeder opening, between adjacent perch arms 80 or a perch of greater arcuate length at a greater radius. The feeder openings 70 may be of different sizes to accommodate different size birds, the 2 openings, however, between any 2 adjacent perch arms being the same size since the arcuate perch spanning the distance between the arms 80 would be at a uniform radius and selected for the purpose of attracting birds of a size suited to the perch radius and the feeder opening size. Thus by providing openings 70 of a larger size on one side of the feeder and a perch located at a greater radius from the feeder, large birds may be encouraged to stay on one side of the feeder while smaller birds are encouraged to use the opposite side, where a perch section of shorter radius and feeder opening is provided.

The design of silo tube and shroud with the silo tube being lower than the round openings prevents wind from vacuuming out seed onto the ground during a high wind, conserving feed. The openings are too small for a squirrel or rodent to get their heads in to eat the seed.

It will also be appreciated that the apertures may be of graduated size, with apertures of one size disposed in a 90 degree section, which will employ a perch of a suitable radius for the aperture size. Thus as many as four different aperture sizes, with perch radii to suit, may be employed. Thus four sizes of birds may be accommodated and encouraged to select a position or segment on the feder so as not to interfere with one another.

While a single form of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A bird feeder comprising:
    (a) a central, hollow, silo-like magazine;
    (b) a cap removably secured over the top of said magazine;
    (c) a tray including an annular trough disposed below the lower end of said magazine and removably secured thereto, and an upstanding sleeve exterior of said magazine and radially outward of said trough;
    (d) an annular shroud telescopically cooperating with said sleeve and having an upper portion extending inwardly to fit closely about said magazine, said shroud and sleeve having cooperating recesses to provide bird feeder openings;
    (e) at least one of said feeder openings being of lesser diameter than remainder; and
    (f) perch means adjacent each of said feeder openings, the perch adjacent said lesser diameter opening being radially closer to the trough center axis than the remainder of the perches.

2. A feeder as in claim 1 wherein said perches are arcuate and supported by radial arms extending from said tray to support the perches at different radii from the trough center axis in accordance with the size of the feeder opening adjacent the perch, whereby the larger the size of the adjacent feeder opening, the farther the perch is spaced therefrom.

3. A feeder as in claim 2 wherein each of the perches comprises an arcuate portion and a depending end tab portion, and the arms are provided with recesses to releasably receive the tab portion.

4. A bird feeder comprising:
    (a) a central feed storage and supply receptacle;
    (b) an annular trough surrounding the lower end of said receptacle to receive feed therefrom by gravity flow;
(c) cover means for the feed in said trough having a plurality of different size openings therein; and
(d) perch means adjacent each of said openings and spaced outwardly from said trough by a distance proportional to the size of the opening, whereby the perch means adjacent the smaller openings are closer thereto than the perch means adjacent the larger openings.

References Cited
UNITED STATES PATENTS

| | | | |
|---|---|---|---|
| 2,365,862 | 12/1944 | Bufton | 119—53 |
| 2,344,367 | 3/1944 | Pueschel | 119—52 R |
| 1,113,887 | 10/1914 | Dragan et al. | 119—52 R |
| 1,301,027 | 4/1919 | Barnes | 119—53 |
| 1,404,251 | 1/1922 | Westenberger et al. | 119—52 R |

HUGH R. CHAMBLEE, Primary Examiner